US006986860B2

(12) United States Patent
Schaefer et al.

(10) Patent No.: US 6,986,860 B2
(45) Date of Patent: Jan. 17, 2006

(54) METHOD FOR PRODUCING A THROTTLE VALVE UNIT WITH INTEGRATED THROTTLE VALVE

(75) Inventors: Wolfgang Schaefer, Grossbottwar (DE); Markus Michels, Stuttgart (DE); Stefan Josten, Remscheid (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 10/200,403

(22) Filed: Jul. 23, 2002

(65) Prior Publication Data

US 2003/0024576 A1 Feb. 6, 2003

(30) Foreign Application Priority Data

Aug. 2, 2001 (DE) ........................................ 101 37 771

(51) Int. Cl.
*B29C 45/14* (2006.01)
*B29C 45/16* (2006.01)

(52) U.S. Cl. ...................... 264/242; 264/250; 264/255; 264/259; 264/328.8

(58) Field of Classification Search ................ 264/242, 264/264, 328.1, 240, 260, 250, 254, 255, 264/328.8, 259; 73/118.2, 118.1, 116
See application file for complete search history.

(56) References Cited

U.S. PATENT DOCUMENTS

| | | | | | |
|---|---|---|---|---|---|
| 3,940,108 | A | * | 2/1976 | Edwards | 251/306 |
| 4,604,254 | A | * | 8/1986 | Yamamoto et al. | 264/254 |
| 4,740,347 | A | * | 4/1988 | Sloan et al. | 264/262 |
| 4,774,750 | A | * | 10/1988 | Platusich | 29/890.127 |
| 5,223,202 | A | * | 6/1993 | Hall | 264/219 |
| 5,304,336 | A | * | 4/1994 | Karlsson et al. | 264/242 |
| 5,409,654 | A | * | 4/1995 | Platusich | 264/161 |
| 5,672,818 | A | * | 9/1997 | Schaefer et al. | 73/118.2 |
| 6,288,534 | B1 | * | 9/2001 | Starkweather et al. | 324/207.2 |
| 6,400,141 | B1 | * | 6/2002 | Apel et al. | 324/207.2 |
| 6,451,238 | B1 | * | 9/2002 | Suzuki et al. | 264/250 |
| 6,581,569 | B2 | * | 6/2003 | Arsic et al. | 123/399 |
| 6,622,698 | B2 | * | 9/2003 | Hayashida | 123/399 |

* cited by examiner

*Primary Examiner*—Angela Ortiz
(74) *Attorney, Agent, or Firm*—Ronald E. Greigg

(57) ABSTRACT

A method for producing a throttle valve unit, which is contained in a throttle device comprised of two housing halves. A receptacle housing for an adjusting drive mechanism that actuates the throttle valve unit is formed onto the throttle device. The throttle valve unit is produced in one piece in a single operation using an injection molding process in which a frame structure is produced, which encompasses a valve surface on both sides of a valve shaft that has bearing elements.

11 Claims, 3 Drawing Sheets

METHOD FOR PRODUCING A THROTTLE VALVE UNIT WITH INTEGRATED THROTTLE VALVE

BACKGROUND OF THE INVENTION

In internal combustion engines, throttle adjusting devices are used in the intake tube section and can regulate the air volume required by the internal combustion engine for the combustion of fuel. As a rule, the throttle adjusting devices include a drive mechanism, the throttle valve supported on a shaft, and a two-part throttle housing, which can be made of cast metal or as an injection-molded plastic part. In addition, the throttle housing is often provided with a separate housing cover, which can be used to seal the housing in order to prevent the intake of outside air.

PRIOR ART

DE 43 29 522 A1 has disclosed a throttle device, which can be built into the intake conduit of an internal combustion engine. The throttle device is comprised of a housing of a throttle valve control unit, a position sensor, and a throttle valve attached to a throttle valve shaft, the throttle device being disposed between the connection on the clean air side of an air filter and the intake system of the internal combustion engine. The air filter connection and/or the intake system are comprised of a plastic and the individual elements of the throttle device are designed in modular fashion and can be joined to one another by means of slid-together, screwed, or clamped connections. The housing and/or the throttle valve can be made of plastic; the throttle valve shaft is embodied in two pieces: the module for the position sensor can be disposed on one half of the shaft and the module for the throttle valve adjusting unit can be disposed on the other half of the shaft. The adjusting unit, the position sensor, and the throttle valve with the throttle valve shaft constitute a common unit, where the housing can be integrated into the air filter connection fitting or the intake system connection.

The subject of WO 95/02493 A1 is a shaped body comprised of plastic. This publication discloses a shaped body made of plastic, preferably produced using an injection molding process, and a throttle valve housing that has a wall whose inner wall surface borders a hollow chamber. An insert part that is covered by the plastic material is disposed inside the wall, at least on the inner wall surface oriented toward the hollow chamber. The insert part is inclined in relation to the normal plane in such a way that a pivotable throttle valve, which is disposed in the hollow chamber and is used to control the output of an internal combustion engine, is flush with this insert part in the idle position of the engine. According to this proposed embodiment, the insert part is made of metal, for example a sheet metal. The insert part includes a section which is bent out from a plane, and can be provided with deformations, in particular with openings that pass through the insert part.

DE 195 25 510 A1 relates to a throttle valve adjusting unit. The throttle valve adjusting unit includes a throttle valve fastened to a throttle valve shaft supported so that it can rotate in a throttle valve fitting. In addition, an adjusting motor, which is supported on the throttle valve fitting and is coupled to the throttle valve shaft, is provided for adjusting the throttle valve shaft. This adjusting motor includes at least one slider and at least one potentiometer path for detecting an adjustment position of the throttle valve shaft and an electrical connection to which the adjusting motor and the potentiometer are connected in a connection chamber. Furthermore, a cover is provided, which terminates in the connection chamber. The at least one potentiometer path is affixed to the cover and the cover has a coupling part formed onto it, which is part of the electrical connection. In addition the cover has at least one contact embodied on it, which electrically contacts a reciprocal motor plug contact connected to the adjusting motor when the cover is mounted onto the throttle valve connection.

OBJECT AND SUMMARY OF THE INVENTION

With the embodiment proposed according to the invention, a throttle valve unit can be produced as an easy-to-use component through the use of multi-component techniques. The actual throttle valve can be manufactured with a frame part running around the edge of the throttle valve surface with a throttle valve shaft embodied as a one-piece component. The ends of the throttle valve shaft between the wings of the throttle valve surface can be produced as bearing pins within the required tolerances so that a throttle valve unit, which is embodied for example as a die-releasing throttle valve component, can be inserted into a throttle valve housing in few handling steps. If a throttle valve unit, which is embodied as die-releasing, i.e. without undercuts, is inserted into a bottom half of a throttle valve housing embodied in the intake tube section, then intermediary assembly steps and machine finishing operations can be eliminated.

The bottom housing half of the throttle valve housing can be embodied directly against an intake section tube of an internal combustion engine, which tube is likewise produced as an injection-molded plastic part, thus eliminating the installation step of attaching the throttle valve housing to the intake tube section in an internal combustion engine, which step can be a source of possible defective air intakes.

In order to fulfill the demands placed on the throttle valve unit with regard to imperviousness and ruggedness, a high-quality plastic is selected as the injection molding material for the throttle valve surface and components possibly injection molded onto it, as well as for a frame structure encompassing the throttle valve surface, in order to assure the required closing precision, the maintenance of dimensional stability, and a temperature stability of the throttle valve unit in all operating states of an internal combustion engine. If the throttle valve unit is produced in the course of the plastic injection molding, then it can be molded in one operation as a unit made of high-quality material. The split throttle valve housing, however, can be injection molded of a cheaper plastic, thus minimizing the quantity of high-quality plastic used.

During production of the throttle valve unit, not only can its bearing elements, i.e. the bearing pins of the throttle valve shaft, be manufactured in a dimensionally stable fashion within the required tolerances, but also if need be, driving features, driving gears, and receiving surfaces or recesses for sensor components can be produced in a single operation during the manufacture of the throttle valve unit. On the one hand, the above-listed attachments on the throttle valve unit can be directly injection molded onto it and on the other hand, these components can also be subsequently mounted onto a throttle valve unit produced in the plastic injection molding process.

With the embodiment proposed according to the invention, the geometry of a frame encompassing the valve surface can be varied in a simple manner, i.e. the material thickness of the frame encompassing the throttle valve surface and the resulting sealing action of the throttle valve unit in the intake tube section of an internal combustion engine can be adapted to the criteria furnished by the client.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
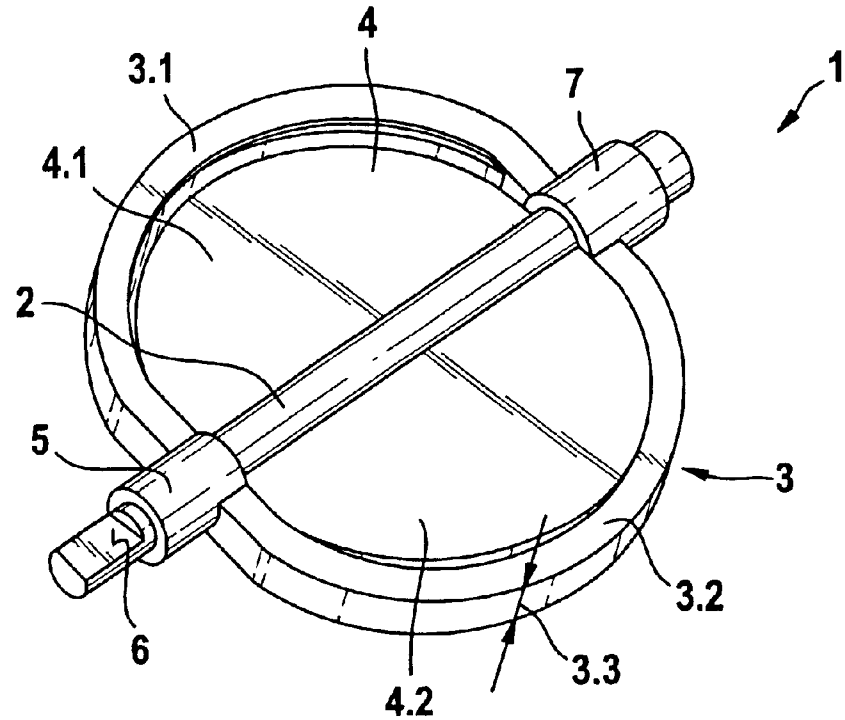
FIG. 1 shows a throttle valve unit with a frame encompassing the valve surface halves and a throttle valve shaft with bearing pins.

The depiction according to FIG. 1 shows a throttle valve unit with a frame encompassing the valve surface halves and a throttle valve shaft with bearing pins embodied in its end regions.

The first embodiment of a throttle valve unit 1 shown in FIG. 1 is embodied as a die-releasing embodiment without undercuts. A valve surface 4 extends on both sides of a valve shaft 2. The valve surface 4 is formed symmetrically onto the valve shaft 2 and has a first wing 4.1 and a second wing 4.2. The two wings 4.1, 4.2 of the valve surface 4 are encompassed by a frame structure 3. The frame structure 3 has a first frame part 3.1 and a second frame part 3.2, which are embodied with a frame thickness 3.3 shown in FIG. 1. The frame thickness 3.3 of the frame structure 3 is dimensioned so that the frame structure 3 protrudes on both sides so that it is raised above the throttle valve surface 4. The first frame part 3.1 and the second frame part 3.2 have an approximately half moon shape and have flattened places in the vicinity of where they transition into a first bearing pin 5 and a second bearing pin 7.

In addition to an embodiment of the first frame part 3.1 and the second frame part 3.2 with a constant frame thickness 3.3, the frame part 3.1, 3.2 can also be embodied with a frame thickness 3.3 that changes over the circumferencial surface of the first wing 4.1 or of the second wing 4.2 of the valve surface 4. In order to reinforce the valve surface 4, it can be useful to embody the frame structure 3 at the transition points in the vicinity of the bearing pins 5 and 7 with a greater frame thickness 3.3 than the one in FIG. 1 during production in the injection molding die. It is likewise conceivable to embody the frame thickness 3.3, which is disposed in the region furthest from the valve shaft 2 of the throttle valve unit 1 according to the depiction in FIG. 1, with a minimal frame thickness 3.3, which has a favorable influence on the adjusting properties of the throttle valve unit 1 when it is actuated by a drive mechanism, preferably an electric one, which is not shown in FIG. 1.

In the end regions of the valve shaft 2, bearing pins 5 and 7 are formed onto the throttle valve unit 1, which is a one-piece component, preferably produced in a two-component injection molding process and injection molded of a high-quality plastic material. Ideally, the injection molding die exerts adjusting forces that are powerful enough to permit the die-releasing throttle valve unit 1 according to the depiction of FIG. 1 to be produced so as to be free of defects. This eliminates the need for a machine finishing of the bearing pins 5 and 7; receiving surfaces 6 can be formed onto the first bearing pin 5. On the one hand, the receiving surfaces 6 can be used to support sensor elements, which can detect the rotary position of the throttle valve unit. The receiving surfaces 6 can also be used as slide-on surfaces for separately installed drive elements not shown in FIG. 1, for example gears or driving features.

Figure 2:
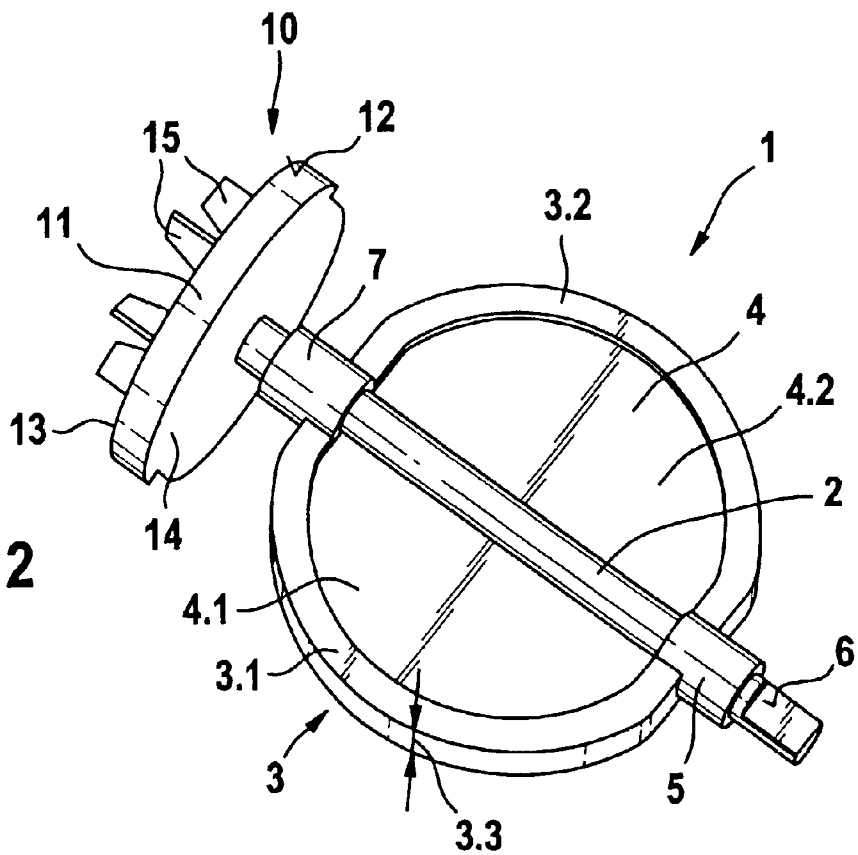
FIG. 2 shows a throttle valve shaft according to the depiction in FIG. 1, with a drive element injection molded onto it.

FIG. 2 shows another embodiment of a one-piece throttle valve unit according to FIG. 1, with drive elements injection molded onto it.

The throttle valve unit 1 according to FIG. 2, which corresponds essentially to the depiction according to FIG. 1, includes a drive element 10 in the vicinity of the second bearing pin 7.

The drive element 10 can be formed directly onto the valve shaft 2 during the production of the throttle valve unit 1 in the course of the two-component injection molding process, i.e. injection molded onto it. The drive element 10 shown in FIG. 2 is embodied as a disc 11. The disc 11 has a first side 13 oriented away from, valve surface 4 and a second side 14 oriented toward the valve surface 4. Individual projections 15 spaced apart from one another are embodied on the first side 13. The projections 15 serve as supports for restoring springs, which can restore the throttle valve unit 1 into its starting position. In lieu of the projections 15 injection molded onto the drive element 10 shown in FIG. 2, an external gearing can also be injection molded onto the circumference surface 12 of the drive element embodied in the form of a disc 11. In addition to the embodiment shown in FIG. 2, with the drive element 10 injection molded onto it, other components, e.g. driving features or the like, can be injection molded onto the valve shaft 2 of the throttle valve unit 1.

The throttle valve unit 1, which is shown by way of example in FIG. 2 as a one-piece component produced in the course of the two-component injection molding process, has a frame structure 3, which encompasses the first wing 4.1 and the second wing 4.2 of the valve surface 4 in an approximately half moon shape. The frame thickness 3.3 of the first frame part 3.1 and the second frame part 3.2 of the frame structure 3 can, as shown in FIG. 2, be produced so that it is constant over the radius of the first wing 4.1 and the second wing 4.2 of the valve surface 4. In addition, analogous to the depiction according to FIG. 1, a frame thickness 3.3 can be provided, which varies over the circumference of the first wing 4.1 and the second wing 4.2.

A receiving surface 6 in the form of a flattened area is formed onto the region of the first bearing pin 5 of the valve shaft 2 and can be used to attach sensor elements or slip-on drive elements to the valve shaft 2 or throttle valve unit 1 according to FIG. 2.

Figure 3:
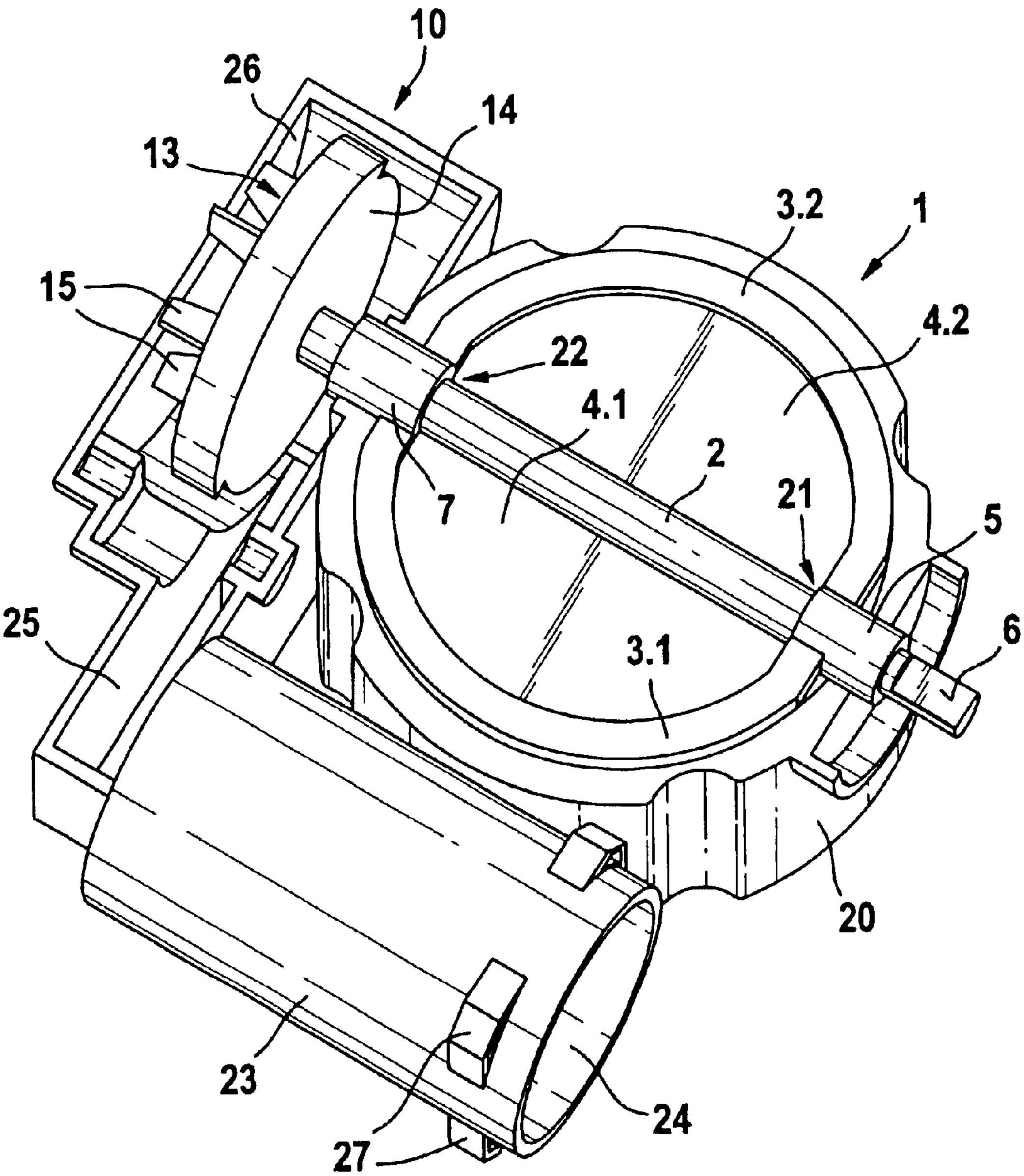
FIG. 3 shows a throttle valve element according to the depiction in FIG. 2, inserted into a lower throttle valve housing half.

FIG. 3 shows the throttle valve unit according to the depiction in FIG. 2, with a drive element injection molded onto it, inserted into a lower housing half of a throttle device.

The lower housing half 20 shown in a perspective top view in FIG. 3 can be embodied as a fitting to be separately installed into the intake section of an internal combustion engine; it is also possible to embody the lower housing half 20 as a lower housing half of a throttle device that is integrated into the intake section of an internal combustion engine. The first housing half 20 includes a first bearing point 21 and a second bearing point 22, into which are inserted the first bearing pin 5 and the second bearing pin 7 of the one-piece throttle valve unit 1 according to FIGS. 1 and 2. A drive housing 23, which in this case is embodied as cylindrical, is injection molded onto the first housing half 20. The drive housing 23 encloses a hollow chamber 24, which can accommodate a preferably electrical drive mechanism that is not shown here. The drive housing 23 is connected by means of a bridge 25 to a first receptacle half 26. The first receptacle half 26 encloses a hollow chamber in the first throttle valve housing half, which in turn provides external protection to the drive element 10 that is injection molded onto the valve shaft 2. The drive element 10 according to the depiction in FIG. 3 has a first side 13 and a second side 14; projections 15 for supporting restoring springs are embodied on the first side 13, spaced apart from one another evenly over the circumference of the drive element 10.

In FIG. 3, the one-piece throttle valve unit 1, which is preferably produced using a two-component injection molding technique, is inserted into the bearings 21, 22, which are embodied on the first throttle valve housing half. A dimensionally stable production of the first bearing pin 5 and second bearing pin 7 renders a subsequent machine finishing of the circumference surfaces of the bearing pins 5 and 7 superfluous so that the throttle valve unit 1 can be inserted into the first housing half 20 immediately after being removed from the injection molding die.

For the sake of completeness, it should be noted that the drive housing 23 of the first housing half 20 is provided with locking elements 27 in which a locking element can lock in detent fashion after a drive mechanism, not shown here, is inserted into the hollow chamber 24 of the drive housing 23.

Figure 4:
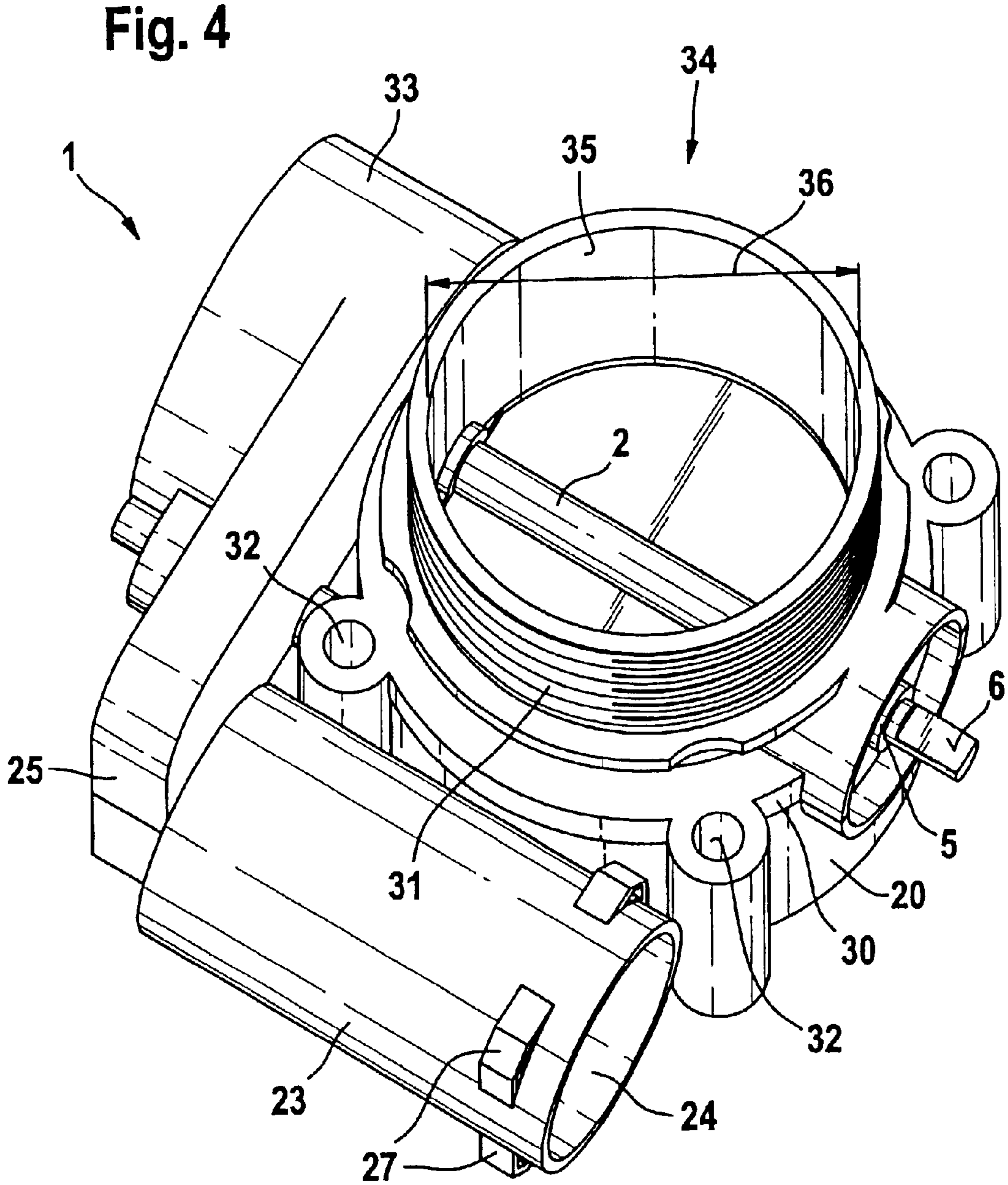
FIG. 4 shows the upper housing half of a throttle valve housing, which is placed onto the lower throttle valve housing half and fixes the inserted throttle valve unit in place.

The depiction according to FIG. 4 shows the second housing half of the throttle valve housing, which is placed onto the first housing half and fixes the inserted throttle valve unit in place.

The second housing half 30 of the throttle device has an upper receptacle half 33 formed onto it, which closes the lower receptacle half 26 formed onto the first housing half 20 shown in FIG. 3 so that the drive element 10 enclosed by the receptacle halves 26, 33 is sealed off from the environment. When assembling the first housing half and when installing the second housing half 30 onto the first housing half 20, a sealing element or gasket, (not shown) can be disposed in the vicinity of the gap at the joint between the two housing halves 20, 30 and can seal the two housing halves 20, 30 against each other, thus preventing the intake of outside air.

A form-fitting element 31 is embodied on the second housing half 30. The form-fitting element 31 is disposed on the outer circumference surface of a fitting 34. An air hose leading from the air filter housing can be snapped on over the form fitting element 31. The wall 35 of the fitting 34 has an inner diameter 36, which corresponds to the cross section, which in the position of the one-piece throttle valve unit 1 shown in FIG. 4, is closed by the first wing 4.1 and the second wing 4.2 of the valve surface 4 of the throttle valve unit 1. An appropriate through flow of air required for combustion in the combustion chambers of an internal combustion engine is set as a function of the rotary position of the throttle valve unit 1, which is dictated by a drive mechanism that can be accommodated in the drive housing 23. Fastening elements are injection molded onto the second throttle valve housing half 30, each of which encompasses a through bore 32. Slide-in screws can be inserted through the through bore 32, with which the housing halves 20, 30 of the throttle device are fixed in relation to each other in a sealed fashion. In the perspective top view of a throttle valve unit 1 shown in FIG. 4, which is mounted in a two-part housing that includes the two housing halves 20 and 30, the first bearing pin 5 formed onto the valve shaft 2, with the receiving surface 6 embodied as a flattened area, protrudes laterally from the housing. Sensor elements can be placed on the receiving surface 6 on the first bearing pin 5 and can detect the rotary position of the throttle valve unit 1 in relation to the inner diameter 36 of the fitting 34. Since the one-piece throttle valve unit 1 represents a single component, a sensor element to be provided on the receiving surface 6 can detect the rotary position of the valve surface 4 or of the first wing 4.1 and second wing 4.2 inside the inner diameter 36 of the fitting 34 with a high degree of precision.

Through the one-piece embodiment of the throttle valve unit 1, whether as a die-releasing component according to the depiction in FIG. 1 or as a throttle valve unit 1 with attachments according to the depiction in FIG. 2, this component can be produced continually in a separate operation from a higher-quality plastic than the plastic material used to produce the first housing half 20 and the second housing half 30. This permits materials cost savings to be realized. In addition, the one-piece, dimensionally stable manufacture of the throttle valve unit 1 permits the elimination of intermediary assembly steps as well as finishing, e.g. burr removal. The die-releasing throttle valve unit 1 can be immediately inserted into the first housing half 20, in which it is fixed in its insertion position and permanently held in place by the mounting of the second housing half 30.

The foregoing relates to preferred exemplary embodiments of the invention, it being understood that other variants and embodiments thereof are possible within the spirit and scope of the invention, the latter being defined by the appended claims.

We claim:

1. A method for producing a throttle valve unit (1), which is contained in a throttle housing that is comprised of two housing halves (20, 30) and has a receptacle housing (23) formed onto it for an adjusting drive mechanism that actuates the throttle valve unit (1), the method comprising forming the throttle valve unit (1) in one piece in a single operation using an injection molding process in which a frame structure (3;3.1, 3.2) is produced, which frame structure (3;3.1, 3.2) encircles a valve surface (4;4.1, 4.2) on both sides of a valve shaft (2) that has bearing elements (5, 7), further comprising forming attachments (10) and/or receiving surfaces (6) onto the valve shaft (2) of the throttle valve unit (1).

2. The method according to claim 1 wherein a drive element (10) and/or rotation imparting features (15) are formed onto the valve shaft (2) in the vicinity of the bearing elements (5,7).

3. The method according to claim 1 wherein receiving surfaces (6) for sensor elements are formed onto the valve shaft (2) in the vicinity of the bearing elements (5, 7).

4. The method according to claim 1 wherein drive components in the form of gears or driving features are formed onto the valve shaft (2).

5. The method according to claim 1 further comprising inserting the throttle valve unit (1) into the first housing half (20), and fixing the throttle valve unit in place in bearings (21, 22) through the installation of the second housing half (30).

6. The method according to claim 1 further comprising injection molding the receptacle housing (23) containing the adjusting drive mechanism onto one of the housing halves (20, 30) so that its longitudinal axis is parallel to the valve shaft (2) of the throttle valve unit (1).

7. The method according to claim 1 wherein the throttle valve unit (1) is made of high-quality plastic and is produced in a single operation using the two-component technique.

8. The method according to claim 1 wherein the housing halves (20, 30) of the throttle device are made of an inexpensive material.

9. A method for producing a throttle valve unit (1), which is contained in a throttle housing that is comprised of two housing halves (20, 30) and has a receptacle housing (23) formed onto it for an adjusting drive mechanism that actuates the throttle valve unit (1), the method comprising forming the throttle valve unit (1) in one niece in a single operation using an injection molding process in which a frame structure (3;3.1, 3.2) is produced, which frame structure (3;3.1, 3.2) encircles a valve surface (4;4.1, 4.2) on both sides of a valve shaft (2) that has bearing elements (5, 7), wherein the frame structure (3) is formed onto the circumference of the valve surface (4) with a frame thickness (3.3) that is constant over the circumference.

10. A method for producing a throttle valve unit (1), which is contained in a throttle housing that is comprised of two housing halves (20, 30) and has a receptacle housing (23) formed onto it for an adjusting drive mechanism that actuates the throttle valve unit (1), the method comprising forming the throttle valve unit (1) in one niece in a single operation using an injection molding process in which a frame structure (3;3.1, 3.2) is produced, which frame structure (3;3.1, 3.2) encircles a valve surface (4;4.1, 4.2) on both sides of a valve shaft (2) that has bearing elements (5.7), wherein the frame structure (3) is formed onto the circumference of the valve surface (4) with a variable frame thickness (2.3).

11. The method according to claim 1 wherein the throttle valve unit (1) is produced as a die-releasing work piece that is free of undercuts.

* * * * *